United States Patent [19]

Pacentino et al.

[11] Patent Number: 4,828,399
[45] Date of Patent: May 9, 1989

[54] COMPOST HANDLING MACHINE

[75] Inventors: Thomas J. Pacentino; Thomas J. Piacentino, Jr., both of Kennett Square, Pa.; Howard Rosenbloom, Westville, N.J.

[73] Assignee: International Process Systems, Lebanon, Conn.

[21] Appl. No.: 104,799

[22] Filed: Oct. 2, 1987

[51] Int. Cl.⁴ .............................. B01F 15/02
[52] U.S. Cl. ............................ 366/345; 71/9; 104/48; 104/137; 104/295; 366/256; 366/258; 366/261; 366/271; 422/184; 422/187; 435/316
[58] Field of Search ................ 366/345–346, 366/349, 332, 241, 255, 256 X, 258 X, 261 X, 271 X; 414/273, 274; 212/161; 104/48 X, 137 X, 50, 249, 250, 251, 295 X, 300, 302, 303; 241/33, 36, 101.2; 422/184 X, 187 X; 71/9 X, 901; 435/313–316 X, 305, 306

[56] References Cited

U.S. PATENT DOCUMENTS

| | | | |
|---|---|---|---|
| 2,895,720 | 7/1959 | Koch et al. | 366/345 |
| 2,922,381 | 1/1960 | Horni | 104/48 |
| 3,294,491 | 12/1966 | Brown | 422/224 |
| 3,357,812 | 12/1967 | Snell | 71/9 |
| 3,432,046 | 3/1969 | Krusinski | 104/48 |
| 3,438,740 | 4/1969 | Brown | 422/225 |
| 3,451,799 | 6/1969 | Brown | 71/9 |
| 3,698,648 | 10/1972 | Rose | 241/33 |
| 3,718,097 | 2/1973 | Tourneau et al. | 104/295 |
| 3,756,784 | 9/1973 | Pittwood | 422/194 |
| 4,193,786 | 3/1980 | Brill | 71/9 |
| 4,236,910 | 12/1980 | Norin et al. | 71/9 |
| 4,377,258 | 3/1983 | Kipp, Jr. | 366/345 |
| 4,495,290 | 1/1985 | Ito et al. | 71/9 |
| 4,559,073 | 12/1985 | Minato et al. | 71/9 |
| 4,594,006 | 6/1986 | Depeault | 366/266 |
| 4,643,111 | 2/1987 | Jones | 110/234 |

OTHER PUBLICATIONS

Brochure from Ag-Ways International, Inc.

Primary Examiner—Harvey C. Hornsby
Assistant Examiner—Corinne M. Reinckens
Attorney, Agent, or Firm—Scully, Scott, Murphy & Presser

[57] ABSTRACT

A compost handling machine comprising a carriage to support the machine for movement along a composting bay, and a compost agitating and conveying assembly to agitate compost in, and to move the compost along the bay. The agitating and conveying assembly includes a conveyor subassembly and a drum subassembly. The conveyor subassembly includes a plurality of lifting cleats that, in use, are moved around a closed path to lift compost in the bay and move the compost rearwardly therein. The drum subassembly includes an agitating drum extending between and supported by a pair of support arms, and the drum is rotated to agitate and comminute the compost in the bay.

7 Claims, 11 Drawing Sheets

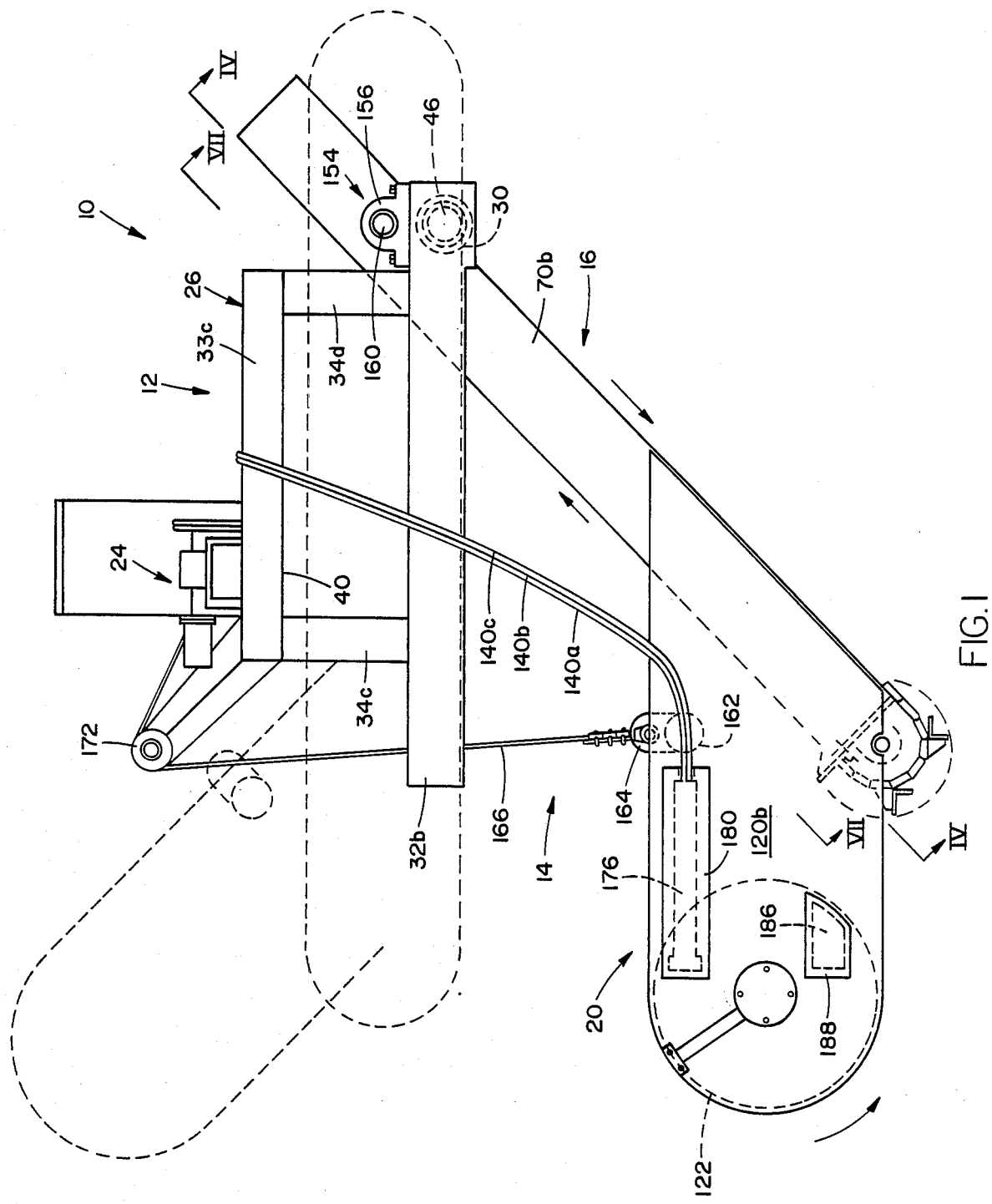

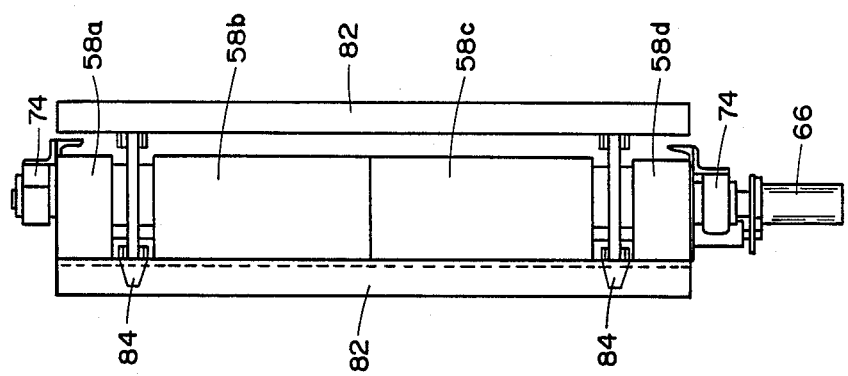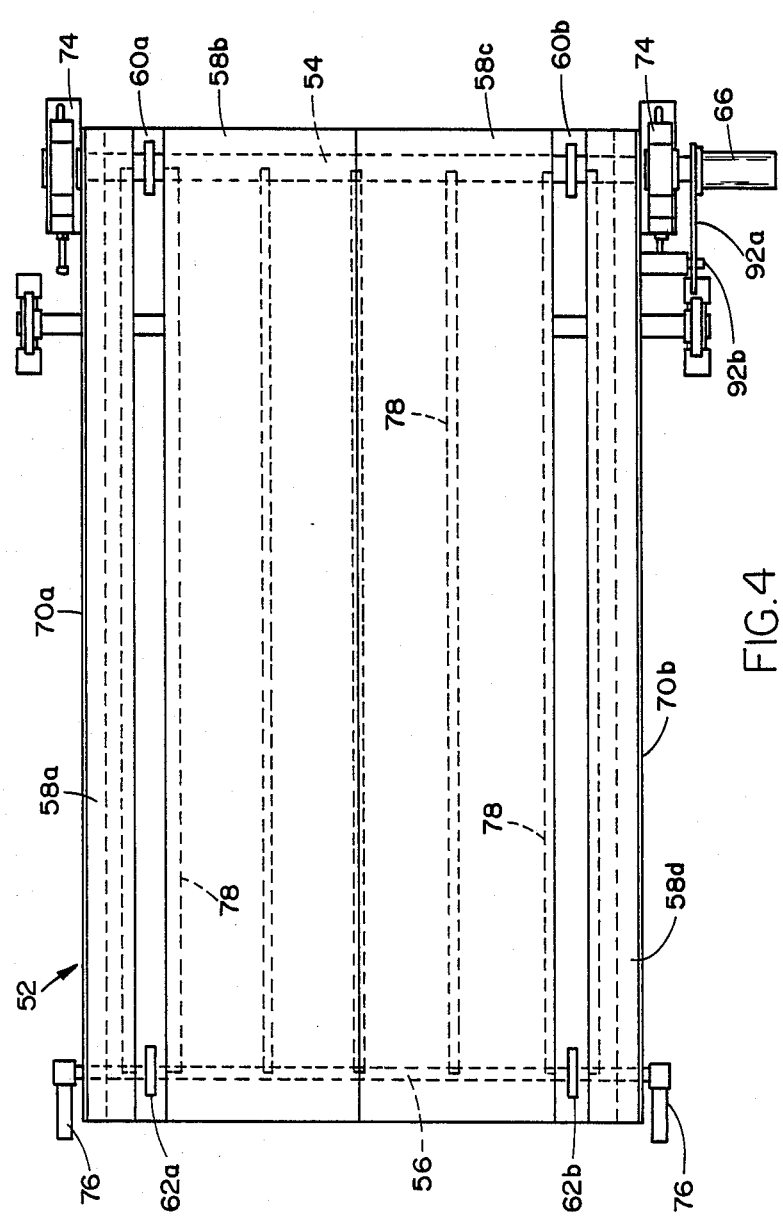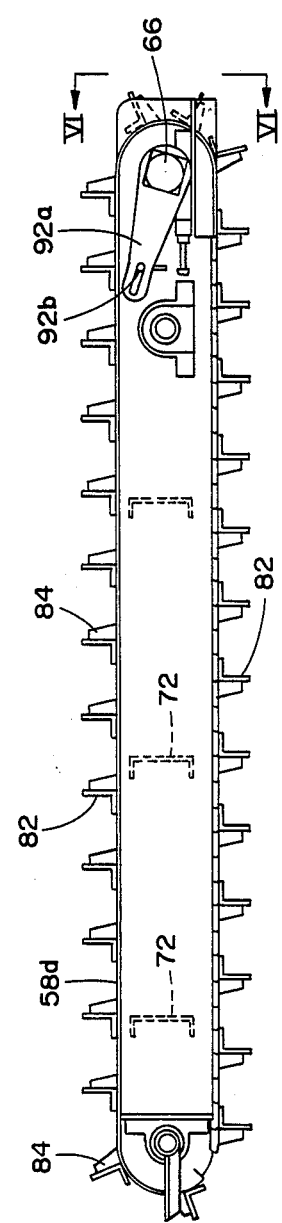

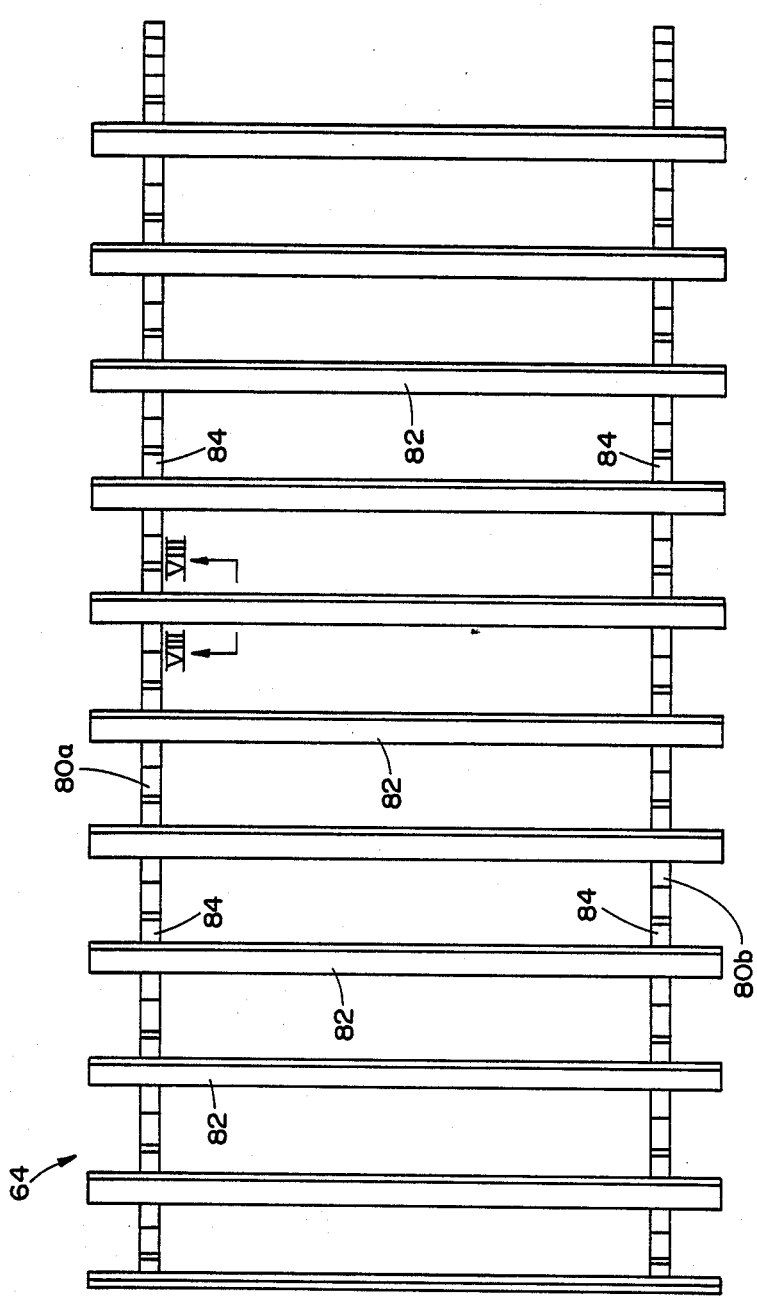
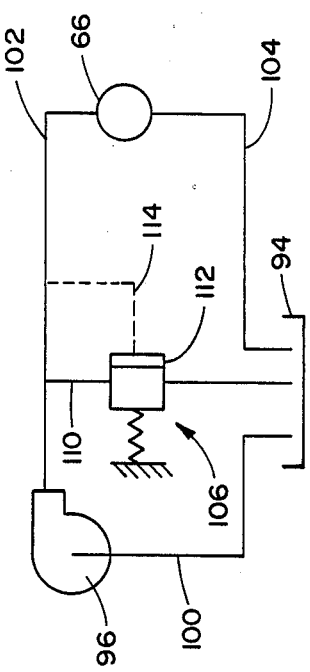
FIG.7
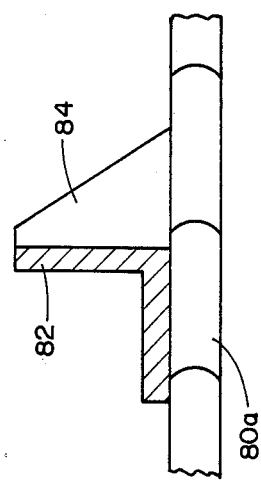
FIG.8
FIG.9

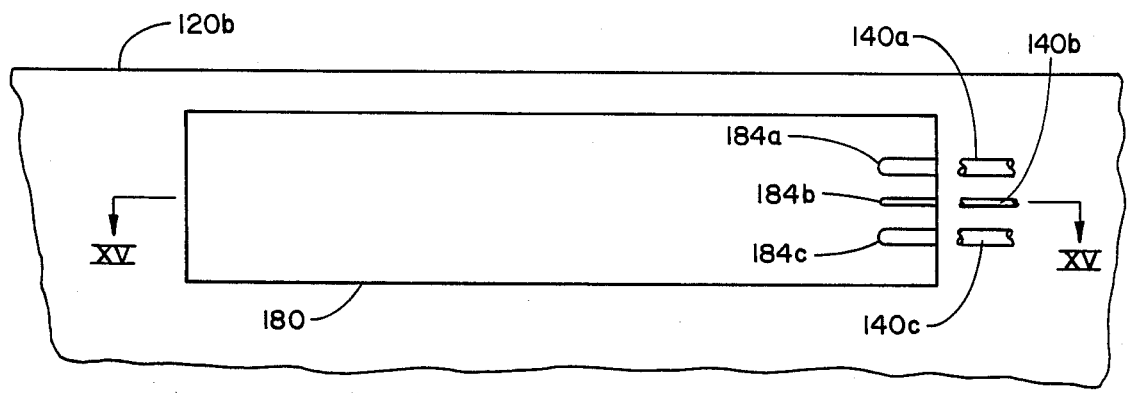
FIG. 13
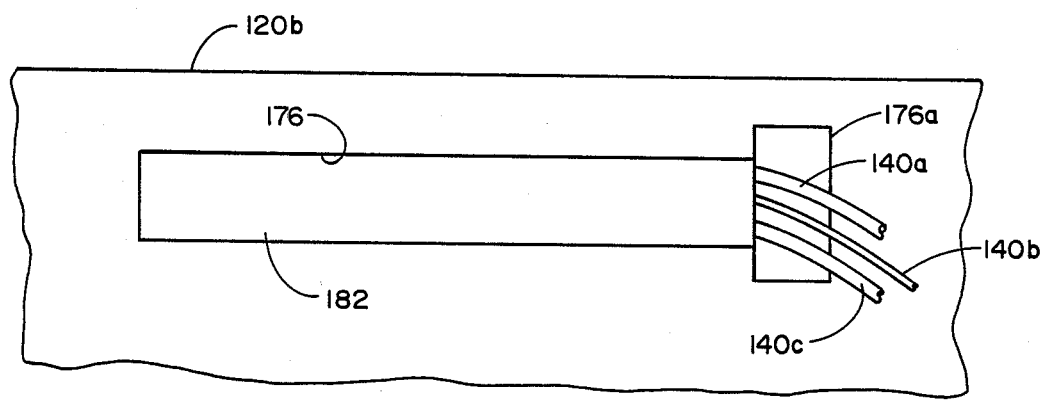
FIG. 14
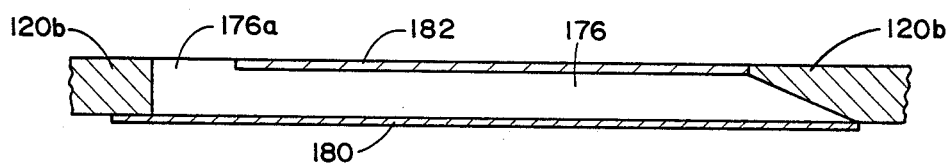
FIG. 15
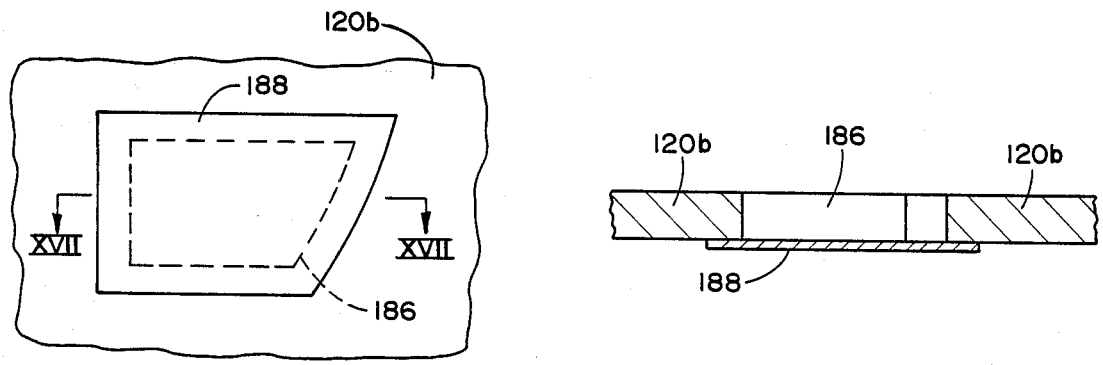
FIG. 16
FIG. 17

COMPOST HANDLING MACHINE

BACKGROUND OF INVENTION

This invention generally relates to compost handling apparatus; and more particularly, to apparatus specifically designed to agitate compost in, and to move the compost along, an elongated bay.

Various controlled composting procedures have been proposed or developed to provide an improved disposal of municipal refuse, sewage, sludge, plant waste and similar biodegradable materials. The advantages attendant with this form of treatment are manyfold and, for instance, the compost or end product of the procedure represents a significant reduction in waste volume. Also, the compost itself may have important commercial value as a fertilizer, for instance.

With one prior art composting procedure, organic waste is mixed with a bulking agent and then deposited in an input end of a elongated bay. Each day the waste is moved a certain distance along the bay and new waste, also mixed with a bulking agent, is added to the input end of the bay. As the waste moves along the bay, it is aerated and gradually changes into a stable, commercially useable compost, and at this point, the compost is removed from the bay.

With this prior art procedure, a machine is used both to help aerate the compost and to move it through the bay. This machine includes a carriage that moves over the compost, on a pair of rails secured to top lateral edges of the bay, a conveyor assembly that extends downward from the carriage and into the bay, and an agitating drum supported forward of the conveyor assembly. In use, the conveyor assembly operates to lift the compost and displace it rearward a certain distance, and the agitating drum is rotated against the compost to agitate, mix and grind the compost prior to its engagement with the conveyor assembly.

Generally, this prior art machine produces satisfactory results, however its performance can be improved upon in several respects. For example, it is has been found that much better results can be obtained by using a larger agitating drum. Providing the machine with a larger drum is complicated, though, by the way the drum is supported. More specifically, the drum is supported by a pair of lateral support arms that extend forward from the conveyor assembly; and in use, these support arms are located closely adjacent the side walls of the composting bay, with the drum laterally extending between the support arms. It is preferred to extend the drum laterally across as much of the bay as is practical; and this limits the thickness of the support arms for the drum, and this, in turn, limits the weight that those arms can carry.

Also, with the prior art machine, the lateral ends of the drum are slightly spaced from its support arms; and, over time, an appreciable amount of compost will be squeezed into the interior of the drum, through that space between the ends of the drum and its support arms. Occasionly, it is necessary to remove the material that accumulates inside the drum; and this normally requires disassembling a large portion of the machine, which is a relatively time consuming and, thus, expensive task. Additionally, with the prior art machine, occasionally a compost carrying plate of the conveyor assembly will strike an object or a piece of debris that has become firmly lodged in the compost, and this will block further movement of that plate. When this happens, the force used to drive the conveyor assembly is increased to try to dislodge that object or debris; however, this sometimes causes the plate of the conveyor assembly to break.

SUMMARY OF THE INVENTION

An object of this invention is to improve compost handling machines.

Another object of the present invention is to increase the diameter of a drum of a compost handling machine of the type that is used to agitate compost in, and to move the compost along, an elongated bay, without increasing the lateral dimensions of the machine.

A further object of this invention is to help remove compost from inside a drum that, in use, is suspended inside a composting bay to agitate compost therein.

Still another object of the present invention is to prevent compost lifting plates that are used to move compost along an elongated bay, from breaking if those plates engage an object lodged in the compost.

Another object of the present invention is to provide a composting facility having a plurality of elongated composting bays with a machine to agitate the compost in, and to move the compost along, the bays, and to control automatically movement and operation of that machine.

A still further object of the present invention is to provide a composting facility having a plurality of elongated composting bays and a machine to agitate the compost in and to move the compost along the bays, and to locate a plurality of limit switches at strategic locations in the composting facility to operate the machine automatically through a regular daily routine.

These and other objects are attained with a compost handling machine comprising a carriage to support the machine for movement along a composting bay; and a compost agitating and conveying assembly, connected to the carriage, to agitate compost in, and to move the compost along, the composting bay. Preferably, the agitating and conveying assembly include spaced apart left and right support arms, and an agitating drum laterally extending between and rotatably supported by those support arms. A hydraulic motor is located inside the drum and connected thereto to rotate the drum.

With this preferred embodiment, a hydraulic circuit is connected to the hydraulic motor to drive that motor, and this circuit includes a plurality of hydraulic fluid lines connected to the motor to conduct fluid to and from the motor. One of support arms of the drum forms an elongated opening longitudinally extending to a position laterally projecting inside the drum; and the fluid lines of the hydraulic circuit extend along an outside surface of this one support arm, through the elongated opening thereof to a position inside the drum, and then to the hydraulic motor. Normally, an outside cover plate is releasably connected to the support arm to cover the elongated through opening therein. In addition, preferably each of the support arms forms a through, access opening laterally projecting inside the drum to facilitate removing debris from within the drum. When the arms are provided with these openings, cover plates may be releasably connected to the support arms to cover the access openings to prevent debris from passing therethrough.

Moreover, preferably the agitating and conveying assembly includes a conveyor frame, and conveyor means supported by the conveyor frame for movement along a closed path to move the compost rearward in the composting bay. With this arrangement, a hydraulic motor is connected to the conveyor means to move that means around that closed path, and a hydraulic circuit is connected to the hydraulic motor to drive that motor. This circuit includes a low pressure reservoir, a high pressure line to conduct high pressure fluid to the motor, and pressure relief means to conduct fluid to the reservoir from the high pressure line, and to thereby by-pass the motor, when the pressure of fluid in the high pressure line rises above a preset value.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 1 is a side elevational view of a compost handling machine according to the present invention.

FIG. 4 is a plan view of a portion of a conveyor subassembly of the machine, taken along the line IV—IV of FIG. 1 but with the lifting cleats and chains of the conveyor subassembly removed.

FIG. 5 is a side view of the conveyor subassembly.

FIG. 6 is a view taken along line VI—VI of FIG. 5.

FIG. 7 is a plan view of the lifting cleats and chains of the conveyor subassembly, taken along line VII—VII of FIG. 1.

FIG. 8 is an enlarged side view showing one carrying cleat of the conveyor subassembly, taken along line VIII—VIII of FIG. 7.

FIG. 9 shows a motor control circuit for the conveyor subassembly.

FIG. 13 is an enlarged view of a portion of the outside surface of one of the drum support arms of the compost handling machine.

FIG. 14 is an enlarged view of the inside surface of the portion of the support arm shown in FIG. 13.

FIG. 15 is a cross-sectioned view taken along line XV—XV of FIG. 13.

FIG. 16 is an enlarged view of another portion of one of the drum support arms.

FIG. 17 is a cross-sectional view taken along line XVII—XVII of FIG. 16.

FIG. 26 is a schematic drawing of a control circuit for the compost handling machine and the transfer dolly of the composting facility.

FIG. 27 is a flow chart illustrating the daily routine for the transfer dolly.

FIG. 28 is a flow chart showing a routine for the compost handling machine.

DETAILED DESCRIPTION OF THE PREFERRED EMBODIMENTS

Figure 3:
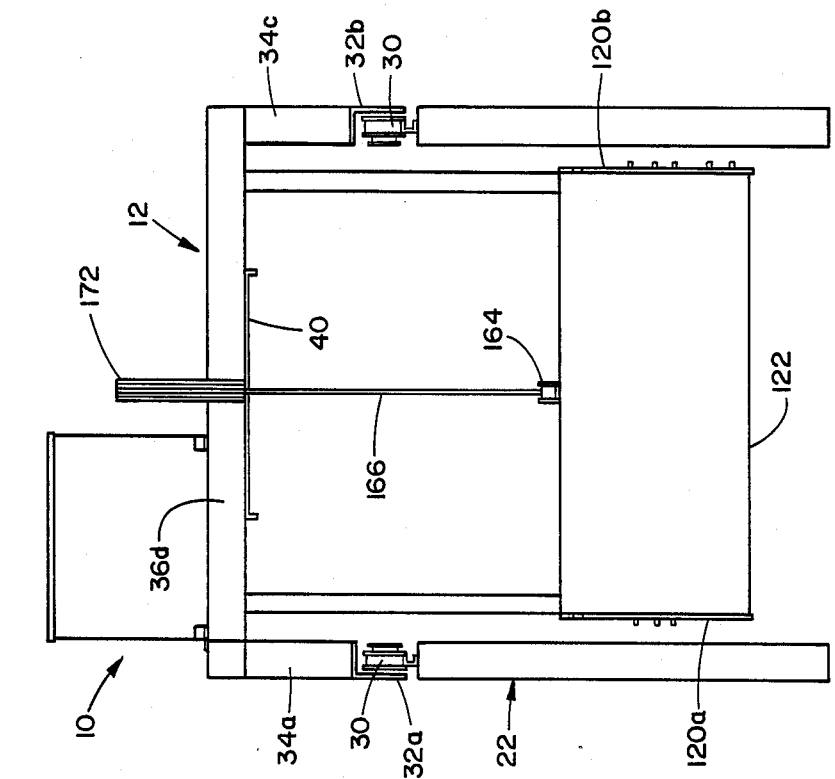
FIG. 3 is a front view of the compost handling machine, showing the machine on a composting bay.
Figure 2:
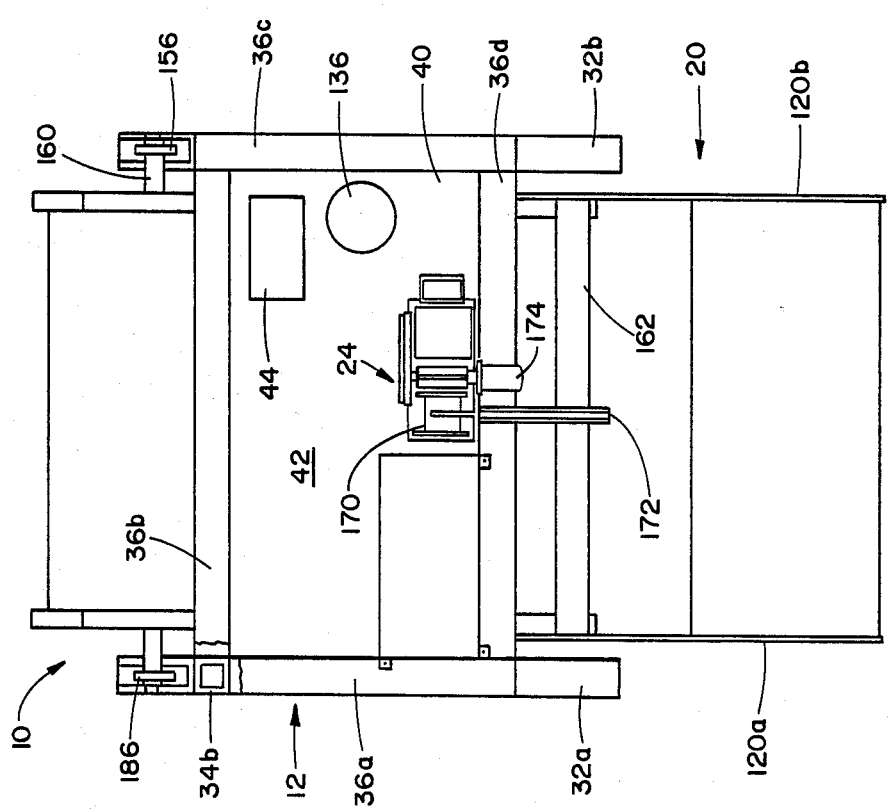
FIG. 2 is a top view of the compost handling machine.
Figure 11:
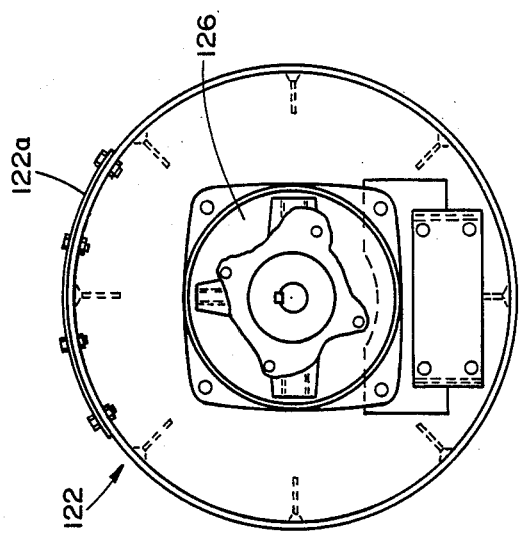
FIG. 11 is a side view of the drum, taken along line XI—XI of FIG. 10.

FIGS. 1–3 illustrate compost handling machine 10 generally comprising carriage 12 and compost agitating and conveying assembly 14; and assembly 14, in turn, includes conveyor subassembly 16 and drum subassembly 20. Generally, carriage 12 is provided to support machine 10 for movement along a composting bays, for example as shown at 22 in Figure 3; and assembly 14 is provided to agitate the compost in, and to move the compost along, the composting bay.

Assembly 14 is connected to carriage 12 for movement between a lowered position, shown in full lines in FIG. 1, and a raised position, shown in broken lines in FIG. 1. In its lowered position, assembly 14 extends downward from carriage 12 so that, in use, the assembly will extend into a composting bay to engage the compost therein; and in its raised position, assembly 14 is positioned so that, in use, the entire assembly is above the sides and end walls of the composting bay, facilitating movement of machine 10 onto and off from the composting bay.

Also, when assembly 14 is in its raised position, the whole machine 10 has a relatively compact shape, which simplifies transporting the machine from one location to another, such as from a factory where the machine is made to a composting facility where it is used. Preferably, machine 10 further includes means such as winch 24, discussed in greater detail below, to move agitating and conveying assembly 14 between its lowered and raised positions.

More specifically, carriage 12 includes frame 26 and a plurality of wheels 30; and frame 26, in turn, includes bottom longitudinal members 32a and b, vertical posts 34a, b, c and d and top horizontal members 36a, b, c and d. Longitudinal members 32a and b generally have an inverted L-shape, and in assembly, these members are spaced apart and parallel to each other and define the width of carriage 12. Vertical posts 34a and b are connected to and extend upward from forward and rearward portions, respectively, of longitudinal member 32a; and posts 34c and d are connected to and extend upward from forward and rearward portions, respectively, of longitudinal member 32b.

Horizontal member 36a is connected to and extends between top ends of posts 34a and b, member 36b is connected to and extends between top ends of posts 34b and d, member 36c is connected to and extends between top ends of posts 34c and d, and member 36d is connected and extends between top ends of posts 34c and a. Plate 40 is connected to and extends between under sides of horizontal members 36a, b, c and d; and this plate, in combination with those horizontal members, forms an equipment bay 42 used to hold various pieces of equipment (discussed below) employed on machine 10. Also, frame 26 may be provided wit a plurality of hooks, brackets, or similar members (not shown) that may be used to connect machine 10 to a crane to lift the whole machine and move it from one location to another.

The various members of frame 26 may be made of any suitable material and may be connected together in any suitable way to form a strong, rigid frame for carriage 12. For example, these members may be made from a steel and welded together to form frame 26.

A pair of right wheels 30 are rotatably connected to front and back portions, respectively, of right longitudinal member 32b, and a pair of left wheels 30 (only one of which is shown in the drawings) are rotatably connected to front and back portions, respectively, of left longitudinal member 32b. More particularly, each of members 32a and i b. include a vertical flange; and the right wheels of carriage 12 are rotatably connected to and laterally located inside the vertical flange of member 32a, while the left wheels of carriage 12 are rotatably connected to and laterally located inside the vertical flange of member 32b. In use, preferably wheels 30 are mounted on the rails of a composting bay, and hence these wheels include inside and outside flanges to help hold the wheels on those rails.

Figure 18:
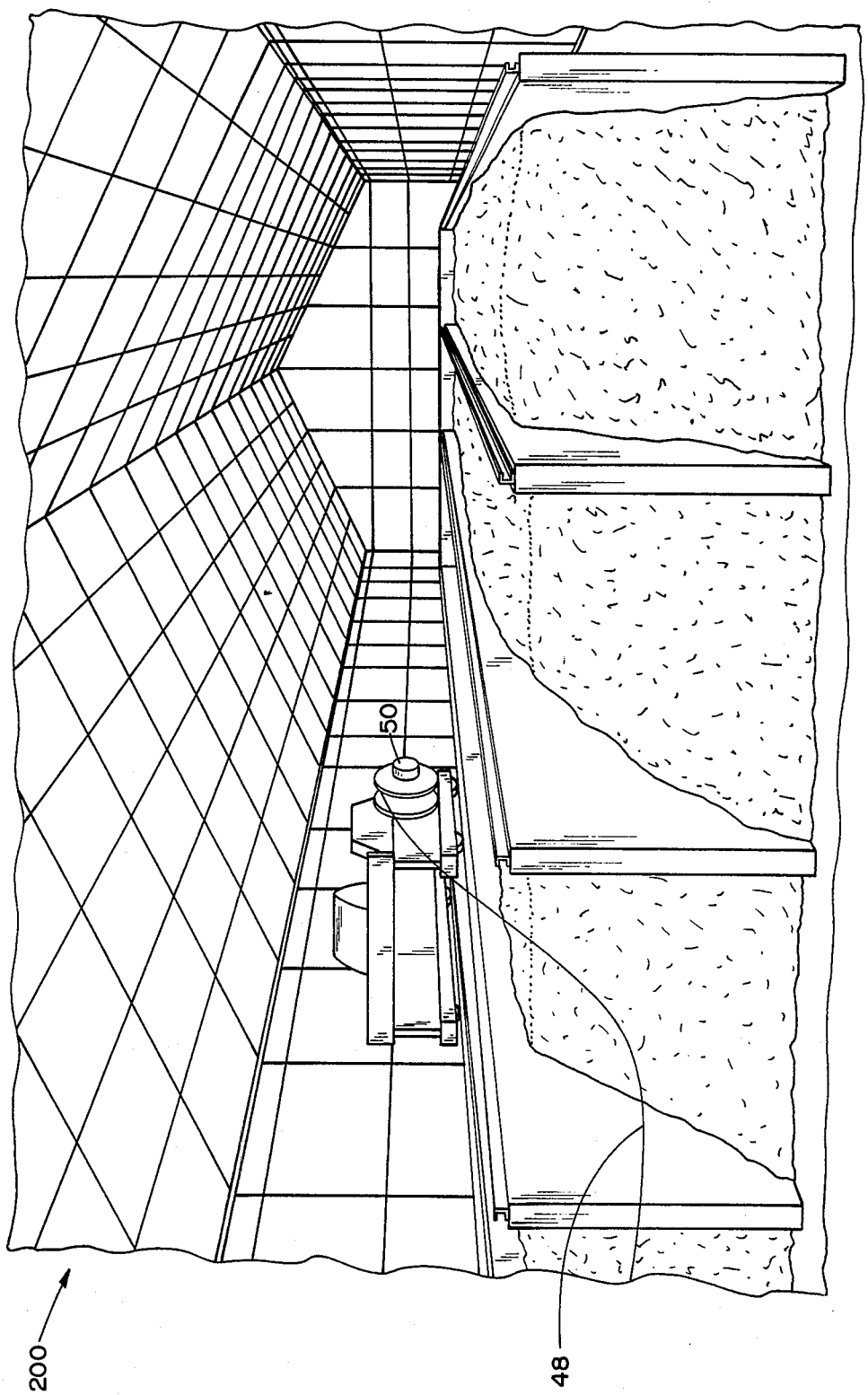
FIG. 18 is a perspective view of a part of a composting facility employing the compost handling machine.

A carriage drive motor, schematically represented at 44 in FIG. 2, is mounted on frame 26, specifically in equipment bay 42, and this motor is connected to one or more of the wheels 30 to drive that wheel or wheels. For instance, the back wheels of carriage 12 may be mounted on drive shaft 46, and carriage drive motor 44 may be connected to this drive shaft, via a sprocket-and-chain assembly (not shown) to rotate that shaft 46 and, thereby, drive wheels 30. Preferably, carriage drive motor 44 is an electric motor, and a cable, shown at 48 in FIG. 18, is used to connect the carriage drive motor to an external power source—that is, a power source not on machine 10 itself. Preferably, this cable is wound around a rotatable spool or drum, shown at 50 in FIG. 18, located to the side of frame 26; and as machine 10 moves rearward along a composting bay, the cable is automatically unwound from this drum. Analogously, as machine 10 moves forward on a composting bay, drum 50 is automatically rotated to wind cable 48 around it to prevent the cable from possibly becoming tangled with or inside machine 10 or the composting bay.

With particular reference to FIGS. 4–8, conveyor subassembly 16 includes conveyor frame 52, upper and lower shafts 54 and 56, a plurality of top plate members 58a, b, c, and d, a plurality of upper sprockets 60a and b, a plurality of lower sprockets 62a and b, conveyor means 64 and conveyor motor 66. Conveyor frame 52 includes parallel, spaced apart left and right side plates 70a and b, and a plurality of transverse beams 72 connected to and laterally extending between these side plates. The various members of conveyor frame 52 may be made from any suitable material, such as steel, and connected together in any suitable way, such as by welding, to form a strong and sturdy frame for conveyor subassembly 16. Top shaft 54 is rotatably mounted on the top end of conveyor frame 52, via a pair of brackets 74 connected to top ends of side plates 70a and b; and, similarly, bottom shaft 56 is rotatably connected to a bottom end of conveyor frame 52 by means of a pair of brackets 76 connected to bottom ends of side plates 70a and b. Shafts 54 and 56 laterally extends across frame 52 and are parallel to each other.

Plate members 58a, b, c and d are mounted on conveyor fram 52; and the plate members longitudinally extend along the conveyor frame, parallel to each other, and form a top surface of conveyor subassembly 16 to support compost as it is carried upward along that subassembly. More specifically, as viewed in FIG. 4, plate member 58a extends over and laterally inward from the top edge of conveyor frame 52, and member 58d extends over and laterally inward from the bottom edge of the conveyor frame. Also, with reference to FIG. 4, plate member 58b extends upward from the vertical center plane of frame 52 to a position slightly spaced from plate member 58d. Each of plate members 58a, b, c and d incudes a top curved section curving around tops shaft 54, and a lower curved section curving around bottom shaft 56. A plurality of ribs 78 may be mounted on beams 72 of frame 52 and longitudinally extend along that frame to support, plate members 58a, b, c, and d.

Upper sprockets 60a and b are mounted on shaft 54 for rotation therewith, and these sprockets are laterally spaced along that shaft, between side plates 70a and b. Even more specifically, sprocket 60a is laterally located between plate members 58a and b, and sprocket 60b is laterally located between plate members 58c and d. Similarily, sprockets 62a and b are mounted on shaft 56 for rotation therewith, and these sprockets are laterally spaced along that shaft, between plates 70a and b; and even more specifically, sprocket 62a is laterally located between plate members 58a and b, and sprocket 62b is laterally located between plate members 58c and d. Preferably, all the sprockets 60a and b are 62a and b have the same diameter; and moreover, sprockets 60a and b are longitudinally aligned with sprockets 62a and b respectively.

Conveyor means 64 comprises a pair of parallel endless chains 80a and b, and a multitude of lifting plates or cleats 82 connected to those chains. Each chain 80a, b comprises a multitude of connected links, and each lifting cleat 82 is connected by a pair of brackets 84 to a pair of laterally aligned links of the chains. Preferably, each cleat 82 has an L-shaped vertical cross section and, in assembly, the cleat laterally extends over or past both side plates 70a and b of conveyor frame 52. In assembly, chain 80a is mounted on sprockets 60a and 62a, and chain 80b is mounted on sprockets 60b and 62b; and the sprockets support the chains and lifting cleats 82 for movement around a closed path defined by the sprockets.

Conveyor motor 66 is connected to upper shaft 54 to rotate that shaft and upper sprockets 60a and b; and as these sprockets rotate, they pull chains 80a and b and lifting cleats 82 around the above-mentioned closed path. In particular, this movement of sprockets 60a and b causes chains 80a and b and lifting cleats 82 to move upward from sprockets 62a and b to sprockets 60a and b, around the latter sprockets and then back to and around lower sprockets 62a and b. Any suitable motor may be used to drive conveyor means 64, although preferably conveyor motor 66 is a variable speed, hydraulic motor.

With the embodiment of conveyor subassembly 16 illustrated in the drawings, an output shaft of motor 66 is directly connected to shaft 54, and it is not necessary to rigidly connect the conveyor motor to conveyor frame 52. Instead, for example, the necessary reaction forces between frame 52 and motor 66 can be provided by a reaction member 92a that is connected to motor 66 and that, during operation of the motor, engages a reaction plate 92b that is connected to side plate 70b of conveyor frame 52. Also, a second conveyor motor (not shown) may be provided to help drive upper shaft 54, and this second motor may also be a variable speed hydraulic motor connected to shaft 54 in the same way that motor 66 is connected thereto.

FIG. 9 is a schematic drawing of a hydraulic circuit for conveyor motor 66; and, generally, this circuit includes reservoir 94, pump 96 and motor 66. Pump 96 draws hydraulic fluid from reservoir 94 through feed line 100, pressurizes this fluid, and then directs the fluid through high pressure line 102 to motor 66. The high pressure fluid rotates the motor drive shaft, causing sprockets 60a and b to rotate; and from motor 66, the hydraulic fluid is returned to reservoir 94 by means of line 104. Preferably, pump 96 has a variable capacity, and this capacity is varied by any suitable control means to vary the speed of lifting cleats 82 along conveyor frame 52.

In use, conveyor sub assembly 16 is lowered into the compost in a composting bay, and motor 66 is operated to move lifting cleats 82 around sprockets 60a, b and 62a, b. As lifting cleats 82 move around lower sprockets 62a and b, the cleats engage the compost material and carry that material upward and rearward, over plate members 58a, b, c and d. As lifting cleats 82 move around upper sprockets 60a and b, the compost material falls downward from the lifting cleats onto or toward the floor of the composting bay. In this way, the compost is both aerated and displaced rearwardly in the composting bay. At the same time, carriage drive motor 44 is operated to drive the whole machine 10 forward on the composting bay so that conveyor assembly 16 passes through all of the compost in that bay, aerating the compost and displacing all of that compost rearwardly in the bay.

During operation of machine 10, occasionally a piece of debris will become lodged in or against one of the conveyor cleats 82 of the conveyor subassembly 16, and hinder or prevent further upward movement of that conveyor cleat. To prevent hydraulic pressure from accumulating in high pressure line 102, which might cause the conveyor cleat to break, the hydraulic control circuit for motor 66 is provided with pressure relief means 106 connected to high pressure line 102 and to reservoir 94 to conduct high pressure fluid back to the reservoir directly from the high pressure line, and thereby by-pass motor 66, when the pressure of fluid in line 102 rises above a preset value.

Preferably, pressure relief means 106 includes by-pass line 110 and control valve 112. Bypass line 110 is connected to high pressure line 102, between pump 96 and motor 66, and to fluid reservoir 94, and control valve 112 is located in by-pass line 110 to control the flow of fluid therethrough. In particular, valve 112 has open and closed positions; and in its open position, the valve conducts fluid from high pressure line 102, through vent line 110 and to reservoir 94; and in its closed position, the control valve directs fluid to motor 66 through high pressure line 102. Control valve 112 is normally held in its closed position, and the valve is connected to high pressure line 102 by pilot line 114 so that the control valve moves from the closed position to its open position when the pressure of fluid in this high pressure line rises above the preset value.

With reference to FIGS. 1 through 3, 10 and 11, drum subassembly 20 includes left and right support arms 120a and b, drum 122, drum connecting means 124 and drum motor 126; and connecting means 124 includes inside support plates 130a and b, shaft 132 and coupling member 134. Generally, left and right support arms 120a and b are connected to conveyor subassembly 16 and extend forward therefrom, and drum 122 laterally extends between and is rotatably supported by those support arms. Motor 126 is connected to one of the support arms 120a or b, extends laterally inward therefrom, is located inside drum 122 and is connected thereto to rotate the drum.

More specifically, left and right support arms 120a and b are connected to and extend forward from left and right side plates 70a and b, respectively, of conveyor subassembly 16, and preferably the drum support arms are parallel to each other. Drum 122 has the shape of a hollow cylinder, defining a central drum axis, and left and right inside support plates 130a and b are connected to the inside surface of the drum and radially extend inward therefrom. As shown in FIGS. 2 and 3, drum 122 laterally extends almost completely between support arms 120a and b, although it is preferred to maintain a small clearance between the drum and each of the support arms so that the drum does not rub against those support arms as the drum rotates around its axis.

Figure 10:
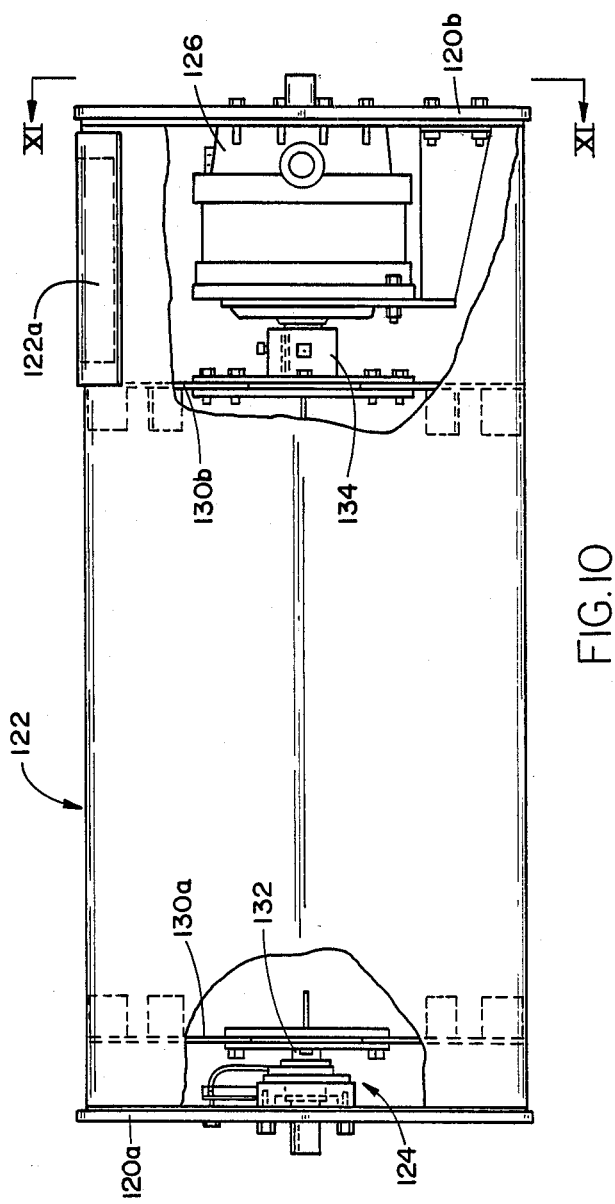
FIG. 10 is a top view of the drum of the compost handling machine, with portions of the drum broken away to show the interior thereof.

With particular reference now to FIG. 10, support shaft 132 is rotatably supported by a forward portion of left support arm 120a, coaxial with the axis of drum 122. Shaft 132 extends rightward from support arm 120a, and the right end of this support shaft is connected to left support plate 130a, supporting the left side of drum 122 for rotation about its axis. Coupling member 134 is drivingly connected to hydraulic motor 126 and to right support plate 130b; and, in this way, coupling member 134 and motor 126 both rotatably support the right end of drum 122 and also may be operated to rotate the drum about its axis.

Any conventional or suitable hydraulic motor 126 may be used to rotate drum 122, and preferably the drum motor is securely bolted or otherwise connected to the inside surface of support arm 120b. Also, an output shaft of motor 126 may be directly connected to drum support plate 130b; although preferably, as shown in FIG. 10, the motor shaft is connected to plate 130b via coupling 134 so that the drum rotates at the same speed as the motor shaft. Motor 126 is driven by a fluid pump, schematically shown at 136 in FIG. 2, which is located in equipment bay 42 of carriage 12; and pump 136 is connected to the drum motor by suitable hydraulic fluid lines 140a, b and c, discussed in greater detail below.

As shown in FIG. 10, motor 126 is directly connected to right support arm 120b and supports the right end of drum 122 via coupling 134, and the left end of the drum is supported by shaft 132. As will be understood by those skilled in the art, this relationship may be reversed, and motor 126 may be connected to left support arm 120a and support the left end of drum 122, while a support shaft may be used to support the right end of the drum. Further, it is not necessary that motor 126 be used to help support drum 122; and drum 122 may be supported independent of drum motor 126, while the motor is drivingly connected either to the drum or to a support shaft therefor to rotate the drum. Alternatively, for certain applications, it may be desirable to use two motors to drive drum 122, and a first of these motors also may be used to support the right end of the drum, as motor 126 does, while the second of these motors may be used in an analogous manner to support the left end of the drum.

Figure 12:
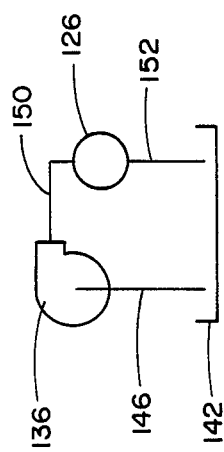
FIG. 12 shows a motor control circuit for the drum.

FIG. 12 is a schematic drawing of a hydraulic circuit for drum motor 126; and, generally, this circuit includes reservoir 142, pump 136, and motor 126. Pump 136 draws hydraulic fluid from reservoir 142 through feed line 46, pressurizes this fluid, and then directs the fluid through high pressure line 150 to motor 126. The fluid rotates the motor shaft, causing drum 122 to rotate about its axis; and from motor 126, the hydraulic fluid is vented to reservoir 142 via return line 152. Preferably, pump 136 has a variable capacity, and this capacity is varied by any suitable control means to vary the rotational speed of drum 122. A third fluid line, referred to as a case drane line (not shown in FIG. 12), is connected to motor 126 to drain to reservoir 142 any fluid that might leak into the drum motor case from the working path of the hydraulic fluid.

Drum 122 is provided with a multitude of tiller teeth (not shown) that extend outward from the drum and that are axially and circumferentially spaced over the outside circumferential surface of the drum. In use, drum 122 is lowered with conveying assembly 16 into the compost in a composting bay, and the drum is rotated about its axis to mix and comminute the compost in the bay. One or more portions of drum 122, for instance as shown at 122a in FIGS. 10 and 11, may be releasably connected to the main portion of the drum to selectively provide access to the interior of the drum, for instance, to help maintain drum motor 126.

With particular reference to FIGS. 1 and 2, connecting means 154 connects agitating and conveying assembly 14 to carriage 12 for movement between the abovementioned lowered and raised positions of assembly 14, and this connecting means includes brackets 156 and support shaft 160. Brackets 156 are secured to and extend upward from end sections of longitudinal members 32a and i b of frame 26, and shaft 160 is supported by and laterally extends between these brackets 156. Shaft 160 also extends through side plates 70a and b of conveyor frame 52, supporting those plates, and the entire assembly 14 for pivotal movement about the axis of shaft 160, between the lowered and raised positions of the compost agitating and conveying assembly 14.

A conventional, electrically operated winch 24 may be used to move assembly 14 between its lowered and raised positions. More specifically, shaft 162 is securely connected to and laterally extends between drum support arms 120a and b, and bracket 164 is securely connected to this shaft. Cable 166 is secured to winch drum 170; and cable 166 extends from drum 170, around pulley 172, and is connected to bracket 164 A conventional, reversible electric motor 174 is drivingly connected to winch drum 170 to rotate that drum selectively to wind cable 166 onto, or to unwind the cable from, the winch drum.

To move assembly 14 from its lowered position to its raised position, motor 174 is actuated to wind cable 166 around drum 170, pivoting assembly 14 about shaft 160 and into its raised position. Releasable connecting means (not shown) may be used to lock assembly 14 to carriage 12 while the assembly 14 is in its raised position. To move assembly 14 from this raised position to its lowered position, any such releasable connecting means is released to unlock assembly 14 from carriage 12; and then motor 174 is actuated to unwind cable 166 from drum 170, allowing assembly 14 to pivot downward under its own weight about shaft 160.

In accordance with the present invention, machine 10 is provided with a drum 122 having a diameter considerably larger than the diameters of drums used with prior art machines of the same general type. This larger drum can be adequately supported by arms 120a and b by forming those arms from a substantially solid material. With particular reference to FIGS. 1 and 13-15, in order to conduct hydraulic fluid lines 140a, b and c from pump 136 to motor 126, an elongated opening 176 is formed in right support arm 120b, longitudinally extending forward to a position laterally projecting inside drum 122; and hydraulic fluid lines 140a, b and c. are passed through this opening, from a location laterally outside arm 120b to a position inside the drum, and therein connected to motor 126.

To reinforce arm 120b around opening 176, outside cover plate 180 is located over that opening and connected to an outside surface of the right support arm, and inside cover plate 182 is placed in opening 176 and also connected to the right support arm. Preferably, outside cover plate 180 extends completely over opening 176; and, as shown in Figure 13, through slots 184a, b and c are formed in the outside cover plate to allow fluid lines 140a, b and c to pass into the elongated opening 176 of support arm 120b. In contrast, inside plate 182 does not extend completely over opening 176, and this plate and arm 120b form a small, forward outlet 176a, and fluid lines 140a, b and c pass outwardly from opening 176 through this outlet. With the embodiment of the invention illustrated in the drawings, outside cover plate 180 is releasably connected to arm 120b, and for example, this cover plate may be bolted to the support arm; and inside cover plate 182 is permanently secured, for example, by welding, to support arm 120b. In addition, preferably, the back edge of opening 176 slants rearwardly outwardly, decreasing the amount of material that must be removed from arm 120b to form the through opening.

As previously mentioned, preferably the lateral ends of drum 122 are slightly spaced from support arms 120a and b; and during operation of machine 10, small amounts of waste material and compost will pass into the interior of drum through these spaces between the drum and its support arms 120a and b. It is desirable to remove this accumulated material occasionally, and each support arm 120a and b is provided with a through opening to provide access to the interior of drum 122 through the support arm to facilitate removing debris from within the drum. One of these access openings is shown at 186 in FIGS. 1, 16 and 17, and this opening extends to a position laterally projecting inside drum 122, and preferably is located at a level below and rearward of the axis of the drum. An analogous opening (not shown) may be formed in left support arm 120a. Cover plates, one of which is shown at 188 in FIGS. 1, 16 and 17, are provided to releasably cover the abovementioned access openings, to reinforce arms 120a and b in the area of these openings and to prevent material and debris from passing inward through those openings while drum 122 is operating within a composting bay. Each of these cover plates 188, preferably, has a relatively flat shape and is releasably connected to a respective support arm via a plurality of bolts.

FIGS. 18–21 show composting facility 200 employing machine 10; and facility 200 further includes a plurality of elongated composting bays 202, 204, 206 and 210, and ventilation system 212, and preferably the composting facility still further includes machine transfer dolly 214 and housing or enclosure 216. Generally, composting bays 202, 204, 206 and 210 are provided to receive organic waste material and to hold that material while it composts. Machine 10 is adapted to move along composting bays 202, 204, 206 and 210 to agitate the compost in and to move the compost along those bays, and transfer dolly 214 is employed to transfer the compost handling machine from one composting bay to another. Ventilation system 212 is in communication with the interiors of composting bays 202, 204, 206 and 210 and is provided to selectively conduct air into the compost in those bays to ventilate the compost and to help control the temperature thereof; and housing 216 forms a shelter or covering for composting bays 202, 204, 206 and 210, machine 10, ventilation system 212 and dolly 214.

More specifically, each composting bay 202, 204, 206 and 210 includes a generally u-shaped frame defining or bounding an interior of the bay; and in particular, each frame includes a bottom floor, and left and right side walls. Preferably, bays 202, 204, 206 and 210 are parallel to each other and are located side-by-side with adjacent bays sharing a common wall. Wall 220 forms the left side wall of bay 202, wall 222 forms the right side wall of bay 202 and the left side wall of bay 204, and wall 224 forms the right side wall of the latter bay and the left side wall of bay 206. Wall 226 forms the right side wall of bay 206 and the left side wall of bay 210, and wall 230 forms the right side wall of bay 210. Rails 220a, 222a, 224a, 226a and 230a are secured to and longitudinally extend along the top surfaces of side walls 220, 222, 224, 226 and 230, respectively, to support compost handling machine 10. Bays 202, 204, 206 and 210 may be made of any suitable material, although preferably the side walls of the bays are made from concrete or cement, the first ten or twelve feet of the floor of each bay is also made from concrete, and gravel is used to form the rest of the floors of the bays.

Transport dolly 214 is located immediately forward of the front ends of bays 202, 204, 206 and 210 and is supported for lateral movement across those front ends. Generally, dolly 214 comprises a support frame 232 and a pair of top rails 234a and b. Frame 232 may be constructed in any acceptable manner, and rails 234a and b are connected to the dolly frame and are supported thereby at the level of rails 220a, 222a, 224a, 226a and 230a of compost bays 202, 204, 206 and 210. The rails 234a and b of transport dolly 214 are parallel to each other and are spaced apart the same distance as the rails 220a, 222a., 224a, 226a and 230a of the composting bays; and, thus, dolly 214 may be moved across the composting bays so that, at different times, dolly rails 234a and b are aligned with the rails 220a and 222a, with rails 222a and 224a; with rails 224a and 226a, and with rails 226a and 230a.

Dolly 214 is supported in any suitable manner for movement across the front ends of composting bays 202, 204, 206 and 210. For instance, a pair of rails 236a and b may be located forward of bays 202, 204, 206 and 210, extending perpendicular to the longitudinal axes thereof, and dolly frame 232 may include a plurality of bottom wheels (not shown) that are mounted on and guided by these rails 236a and b. for movement across the front ends of the composting bays. A suitable motor (not shown) may be connected to the dolly wheels to drive those wheels and to move dolly 214 along rails 236a and b.

To move the compost handling machine 10 from bay 202 to bay 204, for example, dolly 214 is located in a first position, wherein rails 234a and b are aligned with rails 220a and 222a, respectively. Then, compost agitating and transporting assembly 14 of machine 10 is moved to its raised position, and machine 10 is moved along rails 220a and 222a and onto dolly rails 234a and b. Once machine 10 is secured on dolly 214, the dolly is moved along rails 236a and b to a second position where the dolly rails 234a and b are aligned with rails 222a and 224a, and then machine 10 is moved off the dolly rails and onto rails 222a and 224a. Machine 10 is moved along rails 222a and 224a to the back end of bay 204, and then assembly 14 is lowered into the compost in the bay. Machine 10 is then moved forward along bay 204 to agitate the compost therein and to move that compost rearwardly; and once machine 10 reaches a position adjacent the front end of bay 204, the machine is moved, in a manner analogous to that described above, from bay 204 to bay 206, and subsequently, from the latter bay to bay 210.

Preferably, the movement of machine 10 and dolly 14 along and between bays 202, 204, 206 and 210 is controlled automatically, in a manner described in greater detail below. However, the desired movement of machine 10 and dolly 214 may be controlled semi-automatically or manually It may be preferred to extend rails 236a and b to the left of bay 202, to the right of bay 210, or both, so that dolly 216 can be moved to a position laterally to the side of all of the composting bays and in which the dolly does not interfere with loading material into those bays. Also, stops (not shown) may be located at the ends of rails 236a and b to help prevent dolly 214 from rolling off those rails.

Ventilation system 212 is in communication with the interiors of composting bays 202, 204, 206 and 210 and is provided to selectively conduct air into the compost in those bays to ventilate the compost and to help control the temperature thereof. Preferably, the temperature of the compost varies along the length of each bay, and ventilation system 212 includes a multitude of sensors, schematically shown at 252 in FIG. 19, to actuate the ventilation system to conduct air selectively into different sections of the composting bays to maintain desired compost temperature profiles. With the preferredembodiment of the invention illustrated in the drawings, each bay 202, 204, 206 and 210 includes a plurality of, specifically five, sections referenced as a, b, c, d and e, respectively; and ventilation system 212 comprises a multitude of subsystems 212a–t with each subsystem adapted to conduct air into a respective one of the bay sections.

These bay sections do not overlap, and they may be slightly spaced from each other. Thus, the first or "a" section of each bay comprises a forward portion of the bay and extends for a first preset length, and the second or "b" section of the bay is located rearward of the first section of the bay and extends for a second preset length. Similarly, the third or "c" section of each bay is located rearward of the second section of the bay and extends for a third preset length, the fourth or "d" section of the bay is located rearward of the fourth section of the bay and extends for a fourth preset length, and the fifth or "e" section of the bay is located rearward of the fourth section of the bay and extends for a fifth preset length. Also, in practice, it has been found that it may be unnecessary to ventilate the first few feet and the last few feet of each bay.

For instance, with one embodiment of the invention that has actually been reduced to practice, the first ventilated section of each bay starts about twenty-five feet rearward of the front of the bay itself and is about twenty-five feet long, and the second section of each bay is also about twenty-five feet long. The third and fourth sections of each bay are each about thirty-five feet long, and the fifth section of each bay is also about thirty-five feet long and terminates about five feet before the end of the bay.

Ventilation subsystems 212a–e are provided to ventilate the compost in bay sections 202a–e respectively; and ventilation subsystems 212f–j are provided to ventilate the compost in bay sections 204a–e respectively. Analogously, ventilation subsystems 212k–o are provided to ventilate the compost in bay sections 206a–e respectively; and ventilation subsystems 212p–t are provided to ventilate the compost in bay sections 210a–e respectively.

Figure 22:
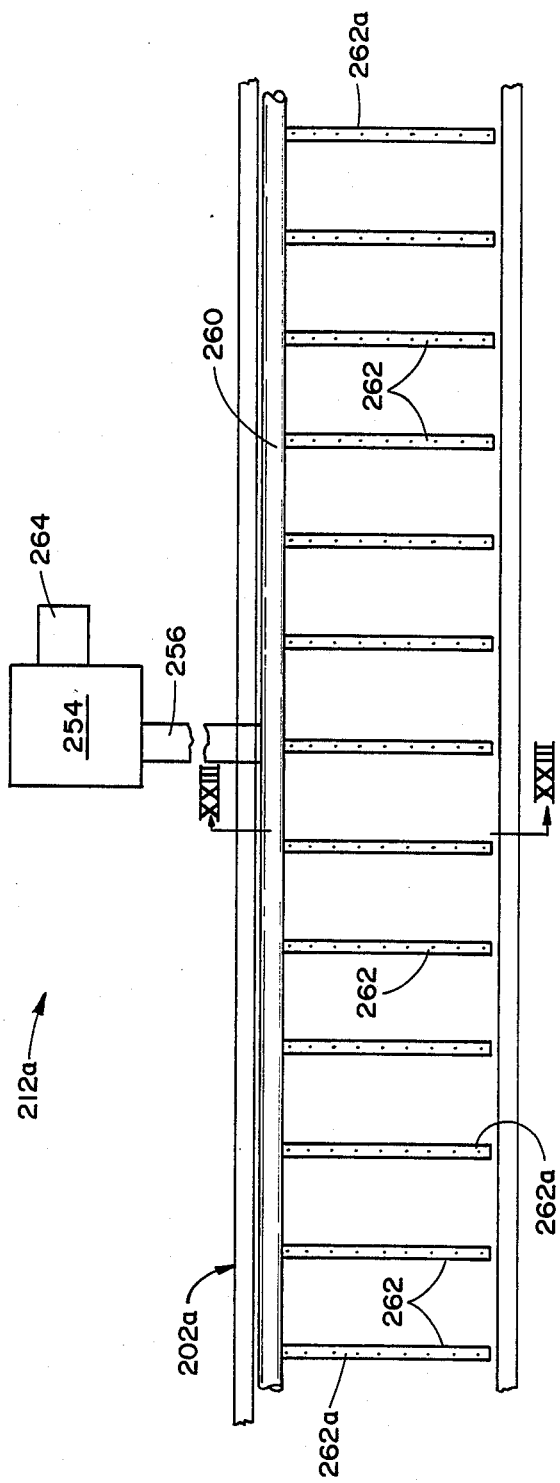
FIG. 22 is an enlarged plan view of a portion of one bay of the composting facility, and in particular, showing a portion of the ventilation system of the facility.
Figure 24:
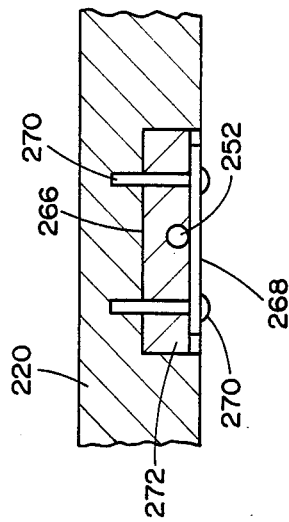
FIG. 24 is a cross-sectional view taken along line XXIV—XXIV of FIG. 23, and illustrating a thermal sensor recessed in a frame of the composting bay.
Figure 23:
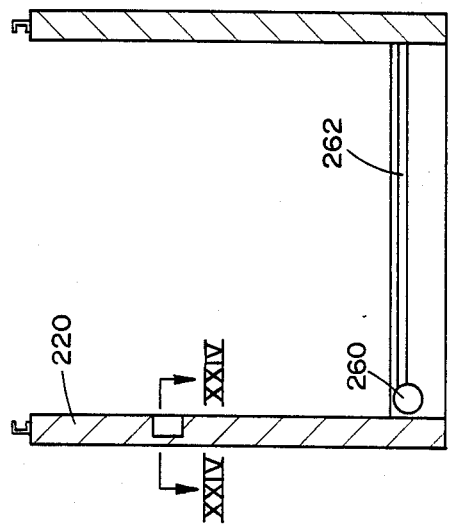
FIG. 23 is a cross-sectional view taken along line XXIII—XXIII of FIG. 22, and also showing details of the ventilation system.

The ventilation subsystems 212a–t are very similar to each other; and only one, subsystem 212a, will be described in detail. With particular reference to FIGS. 22-24, subsystem 212a includes blower 254, feed line 256, header 260, a multitude of distribution lines 262, and sensor 252. Blower 254 is employed to selectively supply a source of air; and in particular, blower 254 has an actuated state, wherein it operates to provide the source of air, and an unactuated state, wherein the blower is not operating. Preferably, blower 254 includes a motor 264 that is used to operate or drive the blower; and motor 264 is actuated and deactivated, respectively, to actuate and deactuate blower 254. Any suitable fan blower, including any suitable motor, may be used in ventilation system 212a, although, preferably, blower motor 264 is an electrically operated motor.

Feed line 256 is connected to blower 254 to receive air therefrom; and feed line 256 extends from blower 254 into bay section 202a, specifically the floor thereof. Header 260 is located in bay section 202a and is connected to feed line 256 to receive air therefrom. Preferably, header 260 is located within the floor of bay section 202a and extends parallel to the longitudinal axis of the bay, along or closely adjacent side wall 220, and preferably feed line 256 is connected to header 260 about midway between the ends of the header. Distribution lines 262 are connected to header 260 to receive air therefrom, and the distribution lines extend from the header, across bay section 202a. Each distribution line has a multitude of top outlets 262a in communication with the interior of bay section 202a to discharge air thereinto from the distribution line. Preferably, distribution lines 262 are parallel to each other, laterally extend across bay 202 and are uniformly spaced apart along the entire length of bay section 202a; and, for instance, lines 262 may be spaced two feet apart over this bay section.

When blower 254 is activated, the blower forces air into feed line 256, and the air is then conducted through that line and into and through header 260. Header 260 conducts the air to distribution lines 262, and air is discharged from these lines into the compost in bay section 202a via outlets 262a. Preferably, the top surfaces and outlets of distribution lines 262 are located at or slightly below the top level of the floor of bay section 202a. Moreover, it is preferred to keep the size of outlets 262a relatively small to prevent gravel and other debris from falling into lines 262 through these outlets, and, for instance, outlets 262a may have a circular shape with a diameter of about one-quarter inch.

Sensor 252 of ventilation subsystem 212a is located in bay section 202a to sense the temperature of compost therein and to actuate ventilation subsystem 212a to conduct air into the compost when the temperature thereof rises above a preset value. Preferably, as shown in FIG. 24, the frame of bay 202, specifically, side wall 220 thereof, defines a recess 266 extending outwardly from the interior of the bay, and sensor 252 is located in that recess. With this preferred arrangement plate 268 is releasably connected to the frame of bay 202, specifically, side wall 220 thereof, to hold sensor 252 in recess 266 and to help keep the compost out of that recess. Plate 268 may be held in place in any suitable way, and for example this plate may be releasably connected to the frame of bay 202 via bolts 270. To help insure that sensor 252 is in good thermal communication with the compost in bay section 202a, plate 268 may be made of a material having good thermal conductivity and the sensor may be held against and securely connected to that plate. Furthermore, recess 266 may be filled with a thermally insulating material 272 to help insulate sensor 252 from heat generated outside of composting bay 202, and preferably plate 268 does not touch side wall 220 to inhibit the transfer of heat therefrom to sensor 252 via plate 268.

Figure 25:
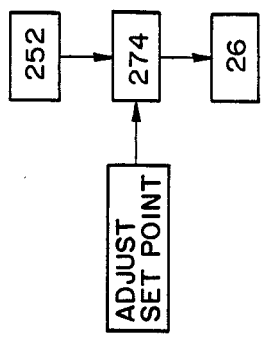
FIG. 25 is a schematic drawing of a control circuit of the ventilation system.

Sensor 252 may be used to control the operation of ventilation subsystems 212a in any suitable way, and Figure 25 is a schematic diagram showing one such control arrangement. Preferably, sensor 252 is a thermocouple which produces an electric output current having a magnitude dependent on the temperature of the sensor; and this current is conducted to a control member 274, which compares that current to a set point value. When the magnitude of the current from sensor 252 rises above that set point, control member 274 generates a control signal that is conducted to and actuates fan blower motor 264, and this motor operates fan 254 to provide air to bay section 202a. Preferably, the above-mentioned set point value is manually adjustable, allowing an operator to vary the temperature of the compost in bay section 202a at which ventilation subsystem 212a is actuated Moreover, preferably control member 274 is a microprocessor programmed in any suitable way to receive input data from sensor 252 and manual input to adjust the set point value, and to actuate motor 264 when the temperature of the sensor rises above that set point value.

Figure 19:
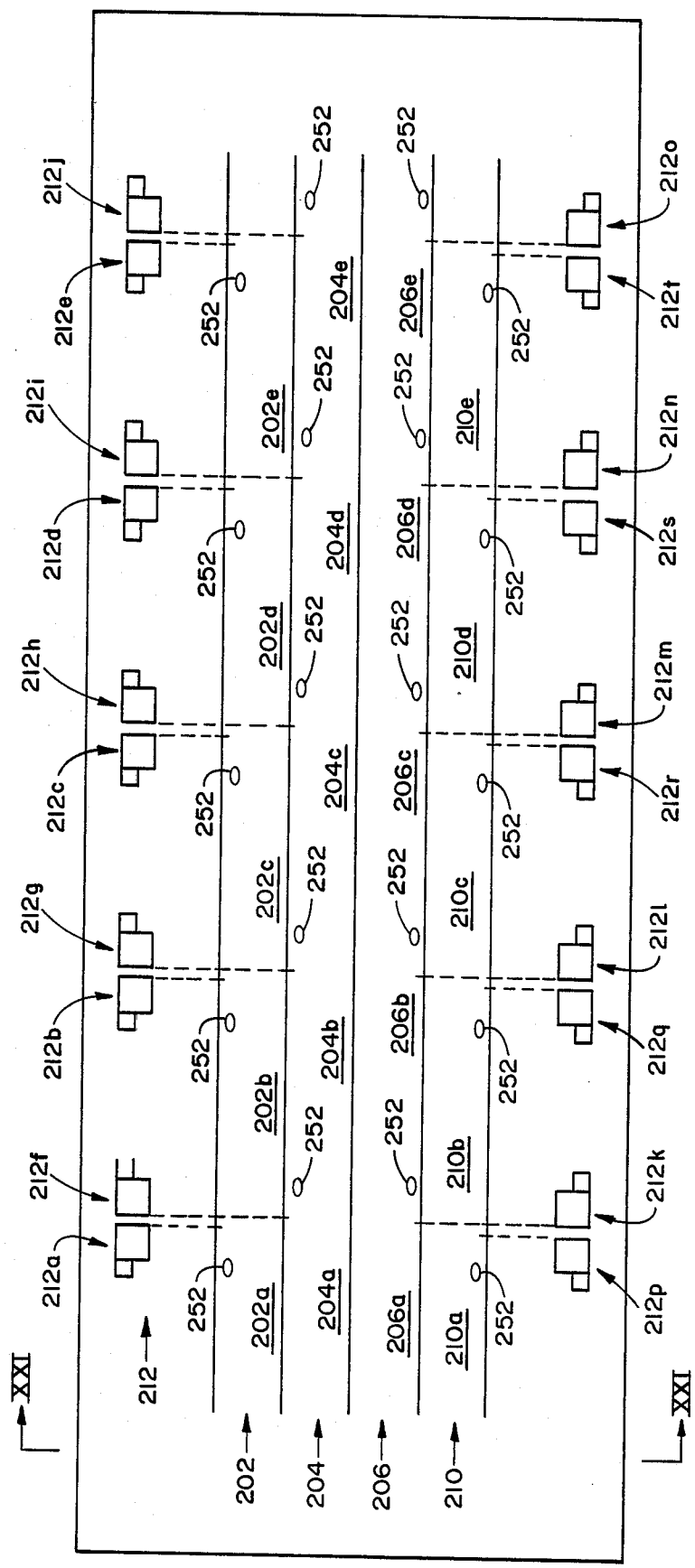
FIG. 19 is a plan view generally showing the outline of the composting facility.

With reference to FIG. 19, preferably the feeder line of each ventilation subsystem enters the respective bay section about midway along the length of that bay section, and the feeder lines to the "a," "b," "c," "d," and "e," sections of interior bays 204 and 206 pass below the feeder lines to the corresponding sections of outside bays 202 and 210. Thus, for instance, the feeder line to bay section 204a extends parallel to and approximately directly below the feeder line to bay section 202a.

With reference to FIG. 19, preferably the feeder line of each ventilation subsystem enters the respective bay section about midway along the length of that bay section, and the feeder lines to the "a," "b," "c," "d," and "e," sections of interior bays 204 and 206 pass below the feeder lines to the corresponding sections of outside bays 202 and 210. Thus, for instance, the feeder line to bay section 204a extends parallel to and approximately directly below the feeder line to bay section 202a.

As previously mentioned, the subsystems 212a-t are generally very similar. However, preferably the temperature of the compost in each composting bay is allowed to vary along the longitudinal direction of the bay, and thus the sensors of the different ventilation subsystems actuate those subsystems at various temperatures. Also, advantageously, the set point of each sensor 252 can be independently, manually adjusted, and all of the ventilation subsystems 212a-t employ a common microprocessor 274 to receive the input signals from the various sensors of the ventilation subsystems and to actuate the fan motors thereof.

The preferred temperature variation of the compost in each bay depends on a number of factors, such as the moisture content of the compost and the type of organic waste in the compost. By controlling the temperature and aeration of the compost, microbial activity during the composting process can be increased to decrease the time required to produce the desired end product.

For example, under certain conditions, it may be preferred to maintain the temperature of the compost in the first, second, third, fourth and fifth section of each composting bay, respectively, at 40° C., 56° C., 56° C., 45° C. and 40° C.

With this preferred temperature distribution, the sensors of subsystems 212a, f, k and p actuate those ventilation subsystems when the temperature of the compost in bay sections 202a, 204a, 206a and 210a, respectively, rises above 40° C.; and the sensors of ventilation subsystems 21b, g, l and q actuate those subsystems when the temperature of th compost in bay sections 202b., 204b, 206b and 210b, respectively, rises above 56° C. Analogously, sensors of subsystems 212c, g, h, m and r actuate those ventilation subsystems when the temperature of the compost in bay sections 202c, 204c, 206c and 210c, respectively, rises above 56° C.; the sensors of ventilation subsystems 212d, i, n and s actuate these subsystems when the temperature of the compost in bay sections 202d, 204d, 206d and 210d, respectively, rises above 5° C.; and the sensors of subsystems 212e, j, o and t actuate these subsystems when the temperature of the compost in bay sections 202e, 204e, 206e and 210e, respectively, rises above 40° C.

As will be appreciated by those of ordinary skill in the art, it is not necessary that composting facility 200 include four composting bays, and the system may be provided with one or more bays. Further, the specific dimensions of the composting bays are not critical, although with one embodiment of the invention that has been actually reduced to practice, each composting bay is approximately 180 feet long, and the interior of the bay is about five and one-half feet deep and five and one-half feet wide. Likewise, it is not necessary that five ventilation subsystems be used to ventilate the compost in each bay, and one or more ventilation subsystems may be used with each bay. The specific number of ventilation subsystems used with a particular bay is determined principally by the extent to which it is desired to exercise control over the temperature of the compost along the length of the composting bay.

Moreover, it is not necessary that each ventilation subsystem be provided with its own blower, and a single blower may be used to provide air for a plurality, or for all, of the ventilation subsystems. For instance, one common blower may be used to provide air for ventilation subsystems 212a-e. If this is done valves may be located in that common blower or in the feed lines of the ventilation subsystems 212a-e to control air flow through those subsystems, and in particular, so that air may be directed into each of the bay sections 202a, b, c, d and e independent of whether air is also being conducted into any other of the bay sections.

Figure 21:
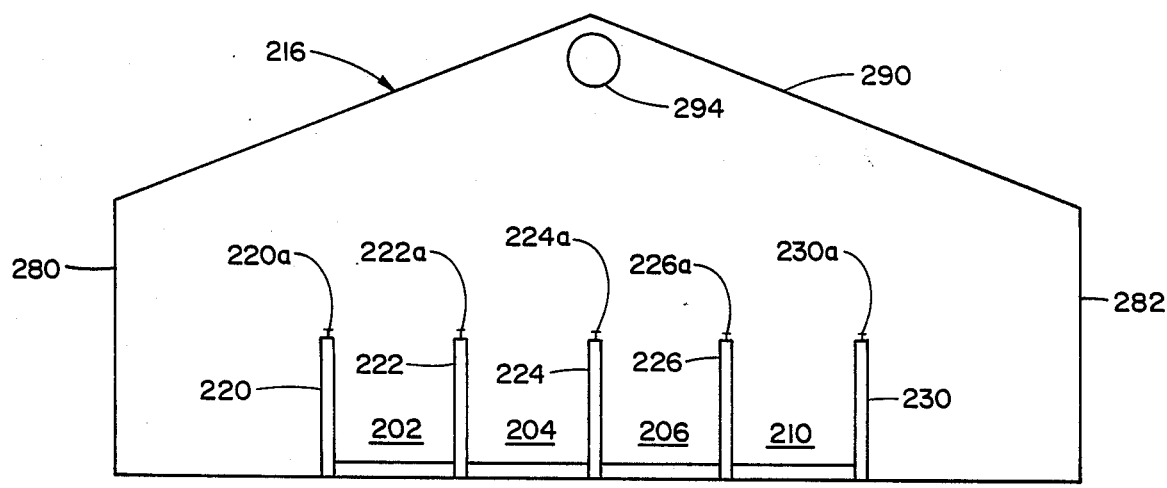
FIG. 21 is a front view of the composting facility, taken along line XXI—XXI of FIG. 19.

With particular reference to FIGS. 19 and 21, housing 216 is provided to enclose composting bays 202, 204, 206 and 210, machine 10, ventilation system 212 and transfer dolly 214; and preferably, the housing includes left and right sidewalls 280 and 282, front and back walls 284 and 286, and roof 290, which are connected together to enclose completely bays 202, 204, 206 and 210, machine 10, ventilation system 212 and transfer dolly 214. Suitable door means (not shown) are provided to allow personnel and equipment to move into and out of housing 216. Also, a ventilation system may be provided to collect gases and vapors from within housing 216 and to discharge those gases and vapors into the atmosphere outside the housing. Preferably, this ventilation system includes a duct 294 located above composting bays 202, 204, 206 and 210 and that is provided with a plurality of inlet openings to collect gases and vapors. Duct 294 may be located closely adjacent roof 290 of housing 216 and extend therealong, parallel to the longitudinal axes of the composting bays. A fan (not shown) may be used to draw gases and vapors into vent duct 294; and one or more filters may be located in the vent duct, or elsewhere in the associated ventilation system, to filter the gases and vapors prior to their being discharged into the atmosphere.

As previously mentioned, preferably compost handling machine 10 is automatically moved through a daily routine to aerate and displace the compost in composting bays 202, 204, 206 and 210; and facility 200 is provided with a plurality of switches and with a system control means to sense the position of machine 10 and dolly 214 at various locations on and about the composting bays, and to move the compost handling machine automatically through the desired operation. FIG. 26 schematically illustrates such system control means, referenced as 300, and such switches, referenced as 302, 304, 306, 310, 312 and 314; and FIG. 26 also schematically shows compost handling machine 10, transfer dolly 214, winch motor 174, carriage drive motor 44, and dolly motor 320.

Generally, switch 302 is actuated to generate a first control signal when dolly 214 is directly forward of any one of the composting bays 202, 204, 206 or 210; and switch 304 is actuated to generate a second control signal when compost handling machine 10 is on a resting position on dolly 214. Switch 306 is actuated to generated a third control signal when compost handling machine 10 is adjacent the back end of any one of composting bays 202, 204, 206, and 210, and switch 310 is actuated to generate a fourth control signal when the composting handling machine is adjacent the front end of any one of the composting bays.

Switch 312 is actuated to generate a fifth control signal when compost agitating and conveying assembly 14 of machine 10 moves into the lowered position, and to generate a sixth control signal when assembly 14 moves into the raised position, and switch 314 is actuated to generate a seventh control signal after the compost handling machine has moved through all four of the composting bays. System control means 300 is connected to switches 302, 304, 306, 310, 312 and 314 to receive the above-mentioned control signals therefrom;

and system control means 300 is connected to dolly motor 320, carriage motor 44, and winch motor 174 to actuate and deactuate those motors selectively to move the compost handling machine and the dolly through the desired routine.

FIGS. 27 and 28 are flow charts that illustrate this desired routine; and, more specifically, FIG. 27 generally outlines the procedure for moving dolly 214 from one composting bay to another composting bay, while FIG. 28 outlines the procedure for moving composting handling machine 10 along each composting bay.

Figure 20:
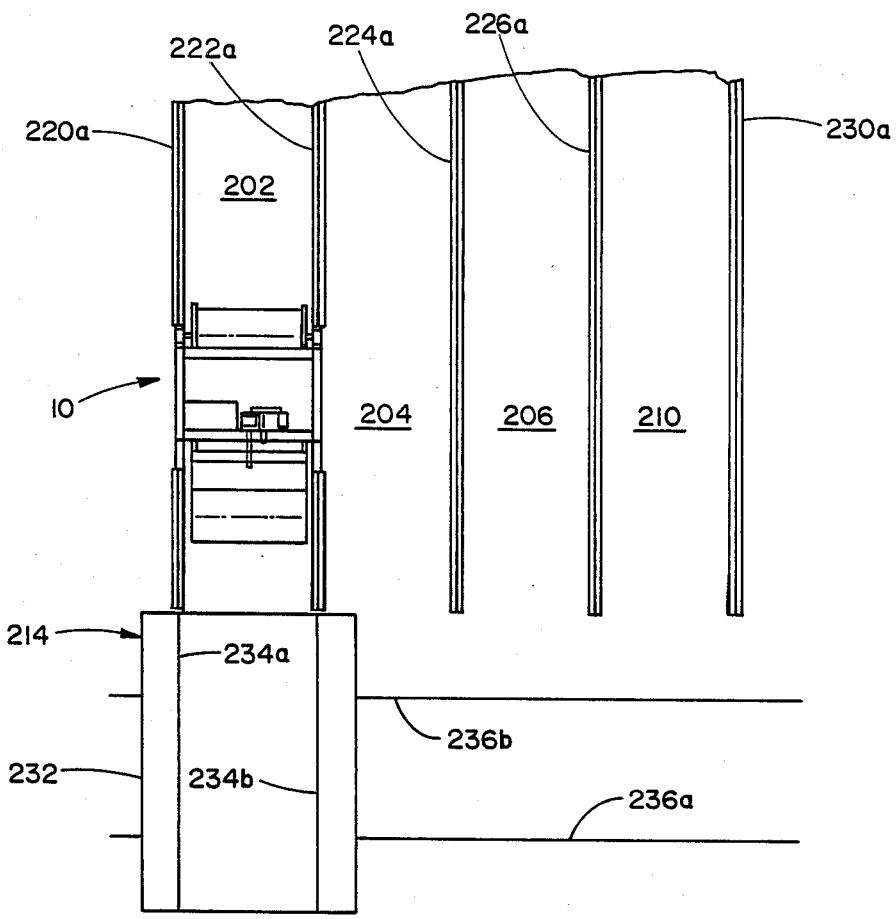
FIG. 20 is an enlarged plan view of a portion of the composting facility, and showing a compost handling machine and a transfer dolly for that machine.

With particular reference to FIGS. 20 and 26–28, at the start of the routine, compost handling machine 10 is resting on transport dolly 214, and that dolly is resting in a start or home position that preferably, as viewed in FIG. 20, is just to the right of being directly forward of composting bay 202. Each day, at a selected time determined by a timer (not shown) a start signal is generated, and dolly drive motor 320 is actuated to move dolly 214 to the left as viewed in FIG. 20. When the dolly reaches a position where it is directly forward of bay 202 and dolly rails 234a and b are aligned with rails 220a and 222a, respectively, an arm (not shown) on the composting bay actuates limit switch 302.

When this happens, dolly drive motor 320 is deactuated, and carriage drive motor 44 is actuated to drive compost handling machine 10 off dolly 214, onto rails 220a and 222a and to the back end of composting bay 202. The actuation of switch 302 may also be used to start pumps 96 and 136 to increase the fluid pressure in fluid lines 102 and 150 respectively. When compost handling machine 10 reaches a pre-selected position adjacent the end of composting bay 202, an arm (not shown) on the bay actuates limit switch 306. When this switch 306 is actuated, carriage drive motor 44 is deactuated, stopping movement of compost handling machine 10 at or near the end of bay 202, and winch motor 174 is actuated to lower compost agitating and conveying assembly 14 into the compost in the composting bay. Switch 312 is located on shaft 160; and when assembly 14 reaches a predetermined position in composting bay 202, this switch 312 is actuated. In response to this, first, winch motor 174 is deactuated so that assembly 14 is held in that predetermined position; and second, drum and conveyor motors 126 and 66, 66a are actuated. Drum 122 begins to rotate about the drum axis, agitating the compost in bay 202; and conveyor means 64 begins to move around sprockets 60a, b and 62a, b so that lifting cleats 82 carry the compost material upward and rearward in the composting bay.

A few seconds after the drum and conveyor motors are actuated, carriage motor 44 is actuated to drive carriage wheels 30 and move composting handling machine 10 forward on rails 220a and 222a. As machine 10 moves forward on those rails, drum 122 continues to rotate in the compost to agitate that compost, and conveying means 64 continues to move around sprockets 60a, b and 62a, b to move the compost rearward in composting bay 202. When compost handling machine 10 reaches a predetermined position at or near the front of bay 202, an arm (not shown) on the bay actuates switch 310; and, when this happens, carriage motor 44 is deactuated, stopping further forward movement of machine 10, and winch motor 174 is actuated to move assembly 14 to the raised position. When assembly 14 reaches this position, the previously mentioned switch 312 is actuated, and when this occurs, winch motor 174 is deactuated and carriage motor 44 is reactuated to drive machine 10 onto dolly 214.

Once compost handling machine 10 reaches a preset position securely on dolly 214, an arm (not shown) on that dolly actuates switch 304; and in response to this, carriage motor 44 is deactuated and dolly motor 320 is actuated to move the dolly to the right as viewed in FIG. 20. Dolly 214 continues to move this way until it is directly forward of bay 204 and dolly rails 234a and b are aligned with rails 222a and 224a respectively. When dolly 214 reaches this position, an arm (not shown) on composting bay 204 actuates switch 302, deactuating motor 320 and actuating carriage drive motor 44 so that compost handling machine 10 moves from the dolly and onto rails 222a and 224a.

Machine 10 is then moved along bay 204 in the same way it was moved along bay 202; and once composting handling machine 10 is finished agitating and conveying the compost in bay 204, the machine is transferred to bay 206 from bay 204 in the same way in which it was moved to bay 204 from bay 202. Machine 10 is then moved along bay 206 in the same way it was moved along bays 202 and 204, then transferred to bay 210 and then moved along that bay in the same manner in which the machine was moved along bays 202, 204 and 206.

After machine 10 has completed agitating and conveying the compost in bay 210, the machine is driven onto dolly 214 and switch 304 is actuated. This deactuates carriage drive motor 44 and actuates dolly motor 320, and dolly 214 begins to move further to the right as viewed in FIG. 20. Immediately, or shortly, after dolly 214 begins this further rightward movement, however, an arm (not shown) on bay 210 actuates switch 314, and this causes dolly motor 320 to reverse directions and return the dolly to the above-mentioned home position. Once dolly 214 is in this home position, dolly motor 320 is deactuated, and the dolly and machine 10 come to a stop. Dolly 214 and compost handling machine 10 remain at rest until the above-mentioned routine is restarted the next day.

Although the operation of facility 200 will be apparent from a review of the above, that operation will now be summarized. Organic waste is deposited inside housing 216 at the front, or loading, end of the bays 202, 204, 206 and 210, where the waste is mixed with an appropriate bulking agent Sawdust has been found to be an effective bulking agent when mixed with the wet waste at a ratio of 0.5 tons of sawdust to each ton of wet waste. It has been found that both chipped waste brush and recycled finished compost can also be used as bulking agents. Because of the extensive mixing obtained at the daily agitation of the compost in bays 202, 204, 206 and 210, it is not necessary to mix thoroughly the mixing agent with the organic waste prior to loading the mixture into the composting bays.

This mixture is then loaded into bays 202, 204, 206 and 210, where it is agitated, aerated and slowly conveyed through the bays while composting takes place. Compost handling machine 10 mixes and moves the compost material down each bay at the rate of 10 feet per day; and after 18 days, the composting is complete, and dry, stable compost arrives at the finishing end of the bay. A single machine 10 can serve four composting bays; and each day, machine 10 starts at the finishing ends of the bays, removing the finished compost and moving toward the front ends of the bays.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A composting facility comprising:
first and second elongated composting bays to receive organic waste material and to hold said material whit it composts, each bay having a front end and a back end;
a transfer dolly supported for movement across the front ends of the composting bays between a first dolly position wherein the transfer dolly is directly forward of the first composting bay, and a second dolly position wherein the transfer dolly is directly forward of the second composting bay, the transfer dolly including a dolly motor to move the dolly between the first and second dolly positions;
a compost handling machine including
   (i) a carriage to support the compost handling machine on the transfer dolly, and on each of the first and second composting bays,
   (ii) a carriage drive motor connected to the carriage to move the carriage along the first and second composting bays, and
   (iii) a compost agitating assembly connected to the carriage, and to agitate the compost in the composting bays,
dolly position sensing means connected to the dolly to generate a first control signal when the dolly is in the first dolly position and when the dolly is in the second dolly position;
machine position sensing means connected to the compost handling machine to generate a second control signal when the compost handling machine is adjacent the back end of any one of the first and second bays; and
system control means connected to the dolly position sensing means to receive the first control signal therefrom, and connected to the machine position sensing means to receive the second control signal therefrom, the system control means being further connected to the dolly motor and the carriage drive motor, to actuate and deactuate each of said motors;
the system control means being adapted to actuate and deactuate the dolly motor and the carriage drive motor selectively to move the dolly to the first dolly position, to move the compost handling machine from the dolly to a position adjacent the back end of the first bay, to move the compost handling machine forward on the first composting bay and back onto the dolly, to move the dolly to the second dolly position, to move the compost handling machine from the dolly to a position adjacent the back end of the second bay, and to move the compost handling machine forward on the second composting bay and back onto the dolly.

2. A composting facility according to claim 1,
the compost handling machine further includes
(iv) means connecting the compost agitating assembly to the carriage for movement between lowered and raised positions, and
(v) an assembly motor connected to the compost agitating assembly to move said assembly between the lowered and raised positions; and the system control means is further connected to the assembly motor to actuate and deactuate the assembly motor selectively to lower the compost agitating assembly into each composting bay after the compost handling machine has reached the position adjacent the back end of the bay, and to raise the compost agitating assembly into the raised position after the compost handling machine has reached a position adjacent the front end of any one of the composting bays.

3. A composting facility according to claim 2,
the machine position sensing means generates a third control signal when the compost handling machine is in the position adjacent the front end of any one of the composting bays; and
the system control means receives the third control signal from the machine position sensing means, and actuates the assembly motor to raise the compost agitating assembly into the raised position in response to receiving the third control signal from the machine position sensing means.

4. A composting facility according to claim 3, wherein:
the machine position sensing means generates a fourth signal when the compost handling machine is on a resting position on the transfer dolly;
the facility further includes assembly position sensing means to generate a fifth control signal when the compost agitating assembly is in the lowered position, and to generate a sixth control signal when the compost agitating assembly is in the raised position; and
the system control means receives the fourth control signal from the machine position sensing means, and is connected to the assembly position sensing means to receive the fifth and sixth control signals therefrom.

5. A composting facility according to claim 4, wherein the dolly position sensing means includes:
a first switch mounted on the dolly;
a first arm connected to the first composting bay to actuate the first switch when the dolly is in the first dolly position; and
a second arm connected to the second composting bay to actuate the first switch when the dolly is in the second dolly position.

6. A composting facility according to claim 4, wherein the machine position sensing means includes:
first, second and third switches mounted on the compost handling machine;
a first arm connected to the first bay adjacent the back end thereof to actuate the first switch when the compost handling machine reaches the position adjacent the back end of the first bay;
a second arm connected to the second bay adjacent the back end thereof to actuate the first switch when the compost handling machine reaches the position adjacent the back end of the second bay;
a third arm connected to the first bay adjacent the front end thereof to actuate the second switch when the compost handling machine reaches the position adjacent the front end of the first bay;
a fourth arm connected to the second bay adjacent the front end thereof to actuate the second switch when the compost handling machine reaches the position adjacent the front end of the second bay; and a fifth arm connected to the transfer dolly to actuate the third switch when the compost handling machine is in the resting position on the dolly.

7. A composting facility according to claim 4, wherein:

the dolly is supported for movement into a home position;

the dolly position sensing means includes means to generate a seventh control signal after the dolly leaves the second dolly position;

the system control means is connected to the dolly position sensing means to receive the seventh control signal therefrom, and the system control means actuates the dolly motor to move the dolly to the home position in response to receiving the seventh control signal.

* * * * *

UNITED STATES PATENT AND TRADEMARK OFFICE
CERTIFICATE OF CORRECTION

PATENT NO. : 4,828,399

DATED : May 9, 1989

INVENTOR(S) : Thomas J. Piacentino, et al.

It is certified that error appears in the above-identified patent and that said Letters Patent is hereby corrected as shown below:

On the Title page, column 1, section 54:
"thomas J. Pacentino" should read as --Thomas J. Piacentino--

Column 5, line 4: "wit" should read as --with--

Column 5, line 20: "ib" should read as --b--

Column 6, line 17: "incudes" should read as --includes--

Column 9, line 43: "ib" should read as --b--

Column 9, line 57: "164" should read as --164.--

Column 12, line 26: "14" should read as --214--

Column 12, line 32: "manually" should read as --manually.--

Column 12, lines 49-50: "preferredembodiment" should read as --preferred embodiment--

Column 14, line 47: "actuated" should read as --actuated.--

UNITED STATES PATENT AND TRADEMARK OFFICE
CERTIFICATE OF CORRECTION

PATENT NO. : 4,828,399

DATED : May 9, 1989

INVENTOR(S) : Thomas J. Piacentino, et al.

It is certified that error appears in the above-identified patent and that said Letters Patent is hereby corrected as shown below:

Column 15, line 32: "21b" should read as --212b--

Column 15, line 33: "th" should read as --the--

Column 18, line 46: "agent" should read as --agent.--

Column 19, line 10, Claim 1: "whit" should read as --while--

Column 19, line 61, Claim 2: "claim 1, the" should read as --claim 1, wherein the--

Column 20, line 11, Claim 3: "claim 2, the" should read as --claim 2, wherein the--

Signed and Sealed this

Thirteenth Day of February, 1990

*Attest:*

JEFFREY M. SAMUELS

*Attesting Officer*  *Acting Commissioner of Patents and Trademarks*